United States Patent
Fox et al.

(10) Patent No.: US 12,311,598 B2
(45) Date of Patent: May 27, 2025

(54) 3D PRINTING WITH COMBINATION OF ADDITIVE PRINTING AND LASER BEAM MACHINING

(71) Applicant: International Business Machines Corporation, Armonk, NY (US)

(72) Inventors: Jeremy R. Fox, Georgetown, TX (US); Randy A. Rendahl, Raleigh, NC (US); Mauro Marzorati, Lutz, FL (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/146,406

(22) Filed: Dec. 26, 2022

(65) Prior Publication Data
US 2024/0208139 A1 Jun. 27, 2024

(51) Int. Cl.
*B29C 64/188* (2017.01)
*B22F 10/60* (2021.01)
*B22F 10/73* (2021.01)
*B22F 10/85* (2021.01)
*B23K 26/16* (2006.01)
*B23K 26/361* (2014.01)
*B29C 64/357* (2017.01)
*B29C 64/393* (2017.01)
(Continued)

(52) U.S. Cl.
CPC ............ *B29C 64/188* (2017.08); *B22F 10/60* (2021.01); *B22F 10/73* (2021.01); *B22F 10/85* (2021.01); *B23K 26/16* (2013.01); *B23K 26/361* (2015.10); *B29C 64/357* (2017.08); *B29C 64/393* (2017.08); *B33Y 10/00* (2014.12); *B33Y 40/20* (2020.01); *B33Y 50/02* (2014.12)

(58) Field of Classification Search
None
See application file for complete search history.

(56) References Cited

U.S. PATENT DOCUMENTS

| 10,591,899 B2 * | 3/2020 | Wike .................. G05B 19/4099 |
| 2015/0134095 A1 | 5/2015 | Hemani et al. |

(Continued)

FOREIGN PATENT DOCUMENTS

| CN | 210525830 U | 5/2020 |
| CN | 210940469 U | 7/2020 |

(Continued)

OTHER PUBLICATIONS

J. Arrizubieta et al., "Combination of Laser Material Deposition and Laser Surface Processes for the Holistic Manufacture of Inconel 718 Components," Materials 2018, 11(7), 1247.

(Continued)

*Primary Examiner* — Yung-Sheng M Tsui
(74) *Attorney, Agent, or Firm* — Patterson + Sheridan, LLP (57) ABSTRACT

A system and methods for enhanced printing to manufacture 3D objects implement optimized utilization of additive printing and subtractive laser beam machining, enabling enhanced, efficient and effective manufacturing of 3D objects. Dynamically allocating the operations and the sequence of operations between additive printing and laser beam machining for each layer of a 3D object being manufactured enables optimizing manufacturing time, power consumption, and material consumption to manufacture 3D objects.

20 Claims, 5 Drawing Sheets

(51) Int. Cl.
*B33Y 10/00* (2015.01)
*B33Y 40/20* (2020.01)
*B33Y 50/02* (2015.01)

(56) References Cited

U.S. PATENT DOCUMENTS

| | | | |
|---|---|---|---|
| 2016/0136887 A1* | 5/2016 | Guillemette | C08J 5/121 |
| | | | 425/297 |
| 2016/0236419 A1* | 8/2016 | Griffin | B29C 64/141 |
| 2016/0332369 A1* | 11/2016 | Shah | G05B 19/188 |
| 2017/0217089 A1* | 8/2017 | Batchelder | B33Y 50/02 |
| 2018/0143147 A1 | 5/2018 | Milner et al. | |
| 2018/0259273 A1 | 9/2018 | Wang | |
| 2018/0297113 A1 | 10/2018 | Preston et al. | |
| 2019/0086154 A1 | 3/2019 | Adriany et al. | |

FOREIGN PATENT DOCUMENTS

| | | | | |
|---|---|---|---|---|
| KR | 20160021540 A | * | 8/2014 | |
| KR | 20170096504 A | | 8/2017 | |
| WO | WO-2015188017 A1 | * | 12/2015 | ......... B29C 67/0055 |
| WO | WO-2016059106 A1 | * | 4/2016 | ......... B29C 37/0025 |
| WO | WO-2021185030 A1 | * | 9/2021 | |

OTHER PUBLICATIONS

Jean-Michel Pelaprat et al., "Nuburu: Nuburu and Essentium Partner to Launch the First Blue Laser-Based Wire Feed Metal 3D Printers," BusinessWire, Dated May 3, 2022, pp. 1-2.
Mohdsuhel, "KLA Instruments Inspection: Laser Beam Machining (LBM)," CivilMint: Building Civilization, Dated Accessed: Oct. 25, 2022, pp. 1-16 https://civilmint.com/laser-beam-machining/.

* cited by examiner

3D PRINTING WITH COMBINATION OF ADDITIVE PRINTING AND LASER BEAM MACHINING

BACKGROUND

The present invention relates to three-dimensional (3D) printing, and more specifically, to performing enhanced 3D printing with an optimized combination of 3D additive printing and subtractive laser beam machining.

3D printing or additive manufacturing is a process of making three-dimensional solid objects from a digital file. The creation of a 3D printed object is achieved using additive processes. In an additive printing process, an object is created by laying down successive layers of material until the object is created. Each of these layers can be seen as a thinly sliced cross-section of the object. 3D printing is the opposite of subtractive manufacturing which is cutting out or hollowing out a piece of metal or plastic with for instance a milling machine. 3D printing can enable production of complex shapes using less material than traditional manufacturing methods.

Currently additive 3D printing is used for manufacturing 3D objects, and can be used for repairing 3D objects, and like structures. There are various 3D printing systems, for example one existing 3D printing system can use the capability of a robotic system and can perform self-mobility, collaborating with swarm 3D printing robots and can perform printing in a collaborative manner.

Laser beam machining (LBM) is a form of machining that uses heat directed from a laser beam. This process uses thermal energy to remove material from material surfaces. Laser beam machining is a subtractive process. Laser beam machining can be performed during 3D printing for creating different types of surface texture, edge finishing, cutting of 3D printed material of different types, and the like. Laser beam machining is well suited for brittle materials with low conductivity, and can be used on most materials.

Some known 3D printers include a 3D printing nozzle or electrode that can perform printing operations with high levels of precision. For example, such 3D printing electrodes can create various complex shapes, surface textures, and the like for the 3D object. For example, existing 3D printing systems or 3D printers can read a digital 3D model and print the 3D object including features that are possible based on the capability of the 3D printer. However, current 3D printers capable of precision printing with a 3D printing electrode must spend significant printing effort for example to print precise surface texture and the like, that can consume substantial time and power to complete additive 3D printing operations for the 3D printed objects.

Performing different types of surface texture, edge finishing, cutting of 3D printed material, and the like, using laser beam machining can require significantly less time and power to complete than needed for 3D additive printing. A need exists for methods and a system by which operations of both 3D additive printing and laser beam machining can be utilized together enabling efficiently and effectively manufacture of 3D objects.

SUMMARY

Embodiments of the disclosure are directed to a system and methods for enhanced printing to manufacture 3D objects with optimized utilization of additive printing and subtractive laser beam machining, enabling enhanced, efficient and effective manufacturing of 3D objects.

A non-limiting disclosed method comprises providing a 3D Printer comprising an additive printing electrode module and a laser beam machining module. A 3D print object controller evaluates each layer in a series of layers of a 3D object to be manufactured using specifications of the 3D object. The 3D print object controller identifies a combination and a sequence of operations between additive printing and laser beam machining for each layer based on the evaluation of specifications of the 3D object. The 3D print object controller forms each layer in the series of layers using the defined sequence of operations between additive printing and laser beam machining for each layer. This method dynamically allocates the 3D object printing operations between the laser beam machining module and the additive printing electrode module for each layer, to enhance manufacture of the 3D object.

Another non-limiting computer implemented method comprises identifying constraints of the additive printing electrode module and the laser beam machining module. The 3D print object controller identifies the operations of the additive printing and laser beam machining based on the identified constraints of the additive printing electrode module and the laser beam machining module.

Another disclosed non-limiting computer implemented method comprises collecting material extracted by laser beam machining module and recycling the collected material to the 3D printer electrode module during 3D printing operations.

Other disclosed embodiments include a computer control system and computer program product for implementing 3D printing to manufacture 3D objects with an optimized combination of additive electrode printing and subtractive laser beam machining utilized together, implementing features of the above-disclosed methods.

DETAILED DESCRIPTION

Problems of existing 3D printers typically include the required overall time, power consumption and material waste for 3D printing to manufacture 3D objects. Embodiments of the present disclosure provide new effective techniques and a 3D printer enabling enhanced 3D printing that can optimize the aggregated manufacturing time, material consumption, and power consumption to manufacture 3D objects.

Embodiments of the disclosure provide a system and methods to implement enhanced 3D printing to manufacture 3D objects with optimized utilization of additive electrode printing and subtractive laser beam machining, enabling enhanced manufacturing of 3D objects. A 3D Printer comprises an additive printing electrode module and a laser beam machining module. A 3D print object controller analyses each layer in a series of layers of a 3D object to be manufactured using specifications of the 3D object. The 3D print object controller identifies the operations for the additive printing electrode and laser beam machining and a sequence of the operations between the additive printing electrode and laser beam machining for each layer. The 3D print object controller sequentially forms each layer using the defined sequence of operations between additive printing and laser beam machining for each layer. This method dynamically allocates the 3D object printing workload between the laser beam machining module and the additive printing electrode module for each layer to enhance the manufacture of the 3D object.

In a disclosed embodiment, the 3D print object controller identifies constraints of the additive printing electrode module and the laser beam machining module. The identified constraints are used for optimizing operations and the sequence of operations of additive printing and laser beam machining, for example applying the constraints to achieve one or more manufacturing goals. For example, the 3D print object controller can minimize an overall manufacturing time for the 3D object by identifying operations and the sequence of operations of additive printing and laser beam machining based on the identified constraints. The 3D print object controller can reduce overall material consumption for manufacturing the 3D object with a combination of operations including additive printing operations to build with approximately zero waste. For example, the 3D print object controller identifies a print area of each layer based on the specifications of the 3D object, and performs grid overlay analysis of the print area. The grid overlay analysis can be used for identifying operations and the sequence of operations between additive printing and laser beam machining to achieve a specific manufacturing goal for the 3D object. In a disclosed embodiment, material extracted by laser beam machining module is collected and recycled to the additive printing electrode module, reducing material waste in the manufacture 3D objects.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
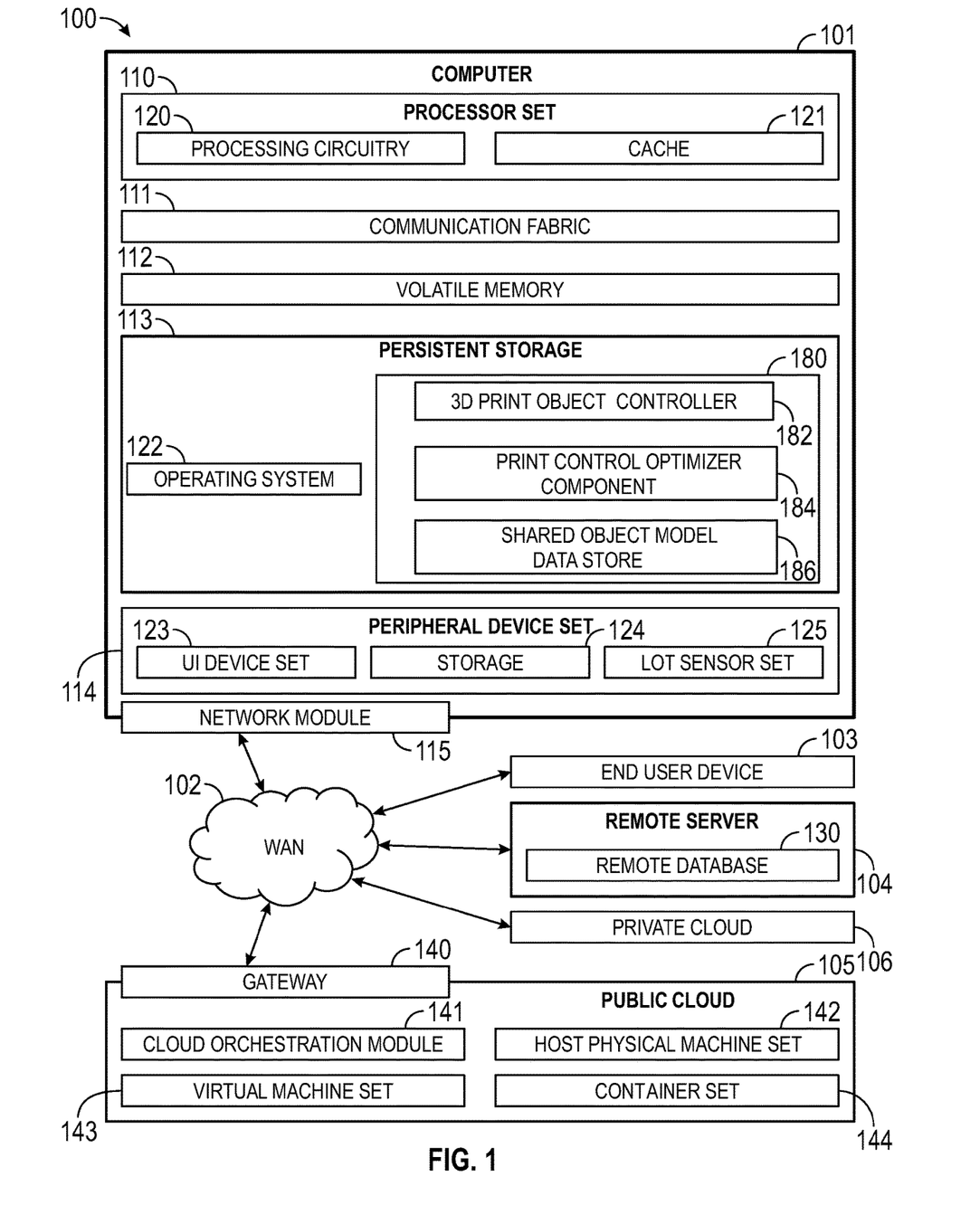
FIG. 1 is a block diagram of an example computer environment for use in conjunction with one or more disclosed embodiments for implementing 3D printing to manufacture 3D objects.

Computing environment 100 contains an example of an environment for the execution of at least some of the computer code involved in performing the inventive methods, such as 3D Print Object Controller 182, Print Control Optimizer Component 184, and Shared Object Model/Plan Data Store 186 at block 180. This description should reveal to the reader what the inventive code does at a general level. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure enable enhanced 3D printing by providing a 3D Printer comprising an additive electrode printing module and a laser beam machining module. A 3D Print Object Controller determines specifications of a 3D object to be manufactured and based on the specifications, manufactures the 3D object in a series of layers. The 3D print object controller evaluates each layer in the series of layers forming the 3D object using specifications of the 3D object. For example, the specifications can include a software 3D printing object model and 3D printing assist plan generated for the 3D object to be manufactured. The 3D print object controller identifies and optimizes operations of additive printing and laser beam machining and a sequence of the identified operations between the additive printing and laser beam machining for each layer based on the evaluation of specifications of the 3D object. The 3D printer with the disclosed 3D Print Object Controller forms each layer in the series of layers using the defined sequence of operations between additive printing and laser beam machining for each layer to optimize manufacturing of the 3D object.

Figure 2:
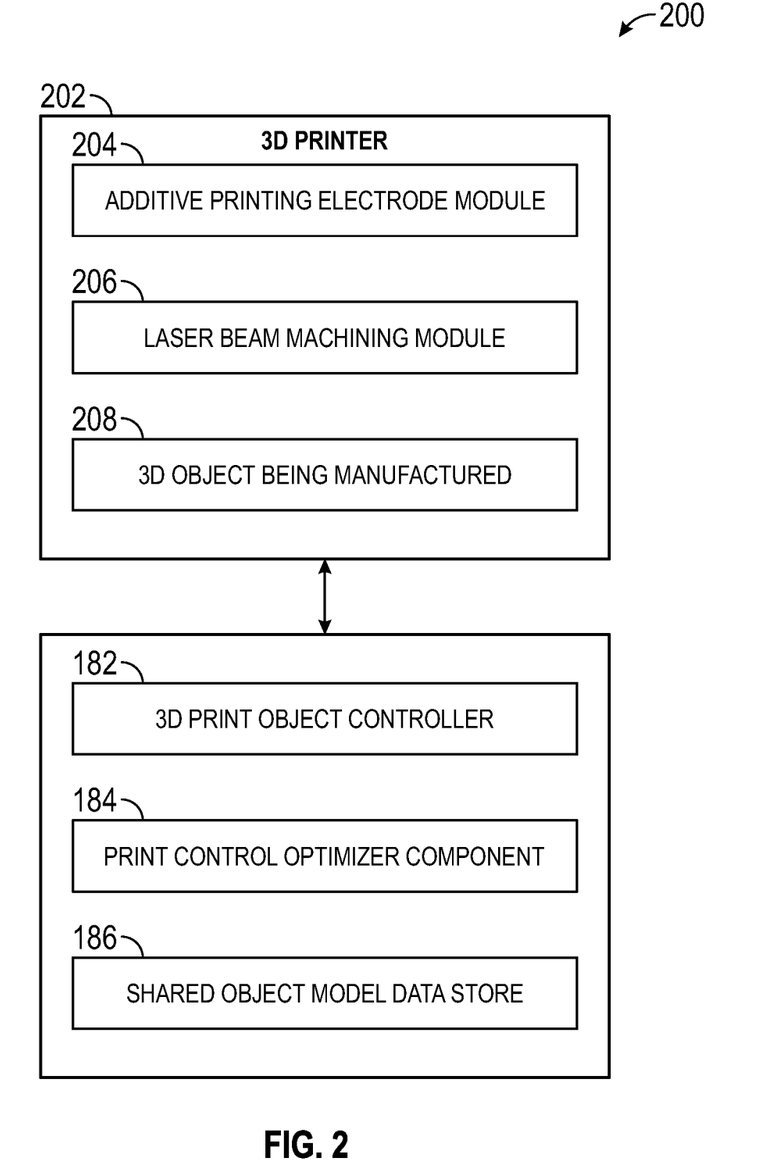
FIG. 2 is a block diagram of an example system for implementing 3D printing to manufacture 3D objects of one or more disclosed embodiments.

FIG. 2 illustrates an example system 200 for implementing enhanced 3D printing for manufacturing 3D objects of one or more disclosed embodiments. System 200 can be used in conjunction with the computer 101 and cloud environment of the computing environment 100 of FIG. 1 for implementing 3D printing for manufacturing 3D objects of disclosed embodiments.

System 200 includes the 3D Print Object Controller 182, Print Control Optimizer Component 184, and Shared Object Model/Plan Data Store 186, for example used together with processor computer 101 of the computing environment 100 of FIG. 1 for implementing 3D printing for manufacturing 3D objects of disclosed embodiments. System 200 includes a 3D printer 202 to implement enhanced 3D printing for manufacturing 3D objects of one or more disclosed embodiments.

The 3D printer 202 includes an additive printing electrode module 204 and a laser beam machining module 206 of disclosed embodiments, which together create a 3D object 208 being manufactured. The 3D printer 202 uses an optimized combination of additive printing and subtractive laser-beam machining operations based on the specifications of the 3D object 208 to be manufactured. The additive printing electrode module 204 performs 3D additive printing with a 3D printing electrode (also called a 3D printing nozzle) that can perform additive printing operations for example with high levels of precision. The 3D printer 202 provides dynamic positioning of the additive printing electrode module 204 for additive printing operations and of the laser beam machining module 206 for laser-beam machining operations.

The 3D printer 202 manufactures the 3D object 208 in a series of layers based on specifications of a 3D object 208 to be manufactured with an optimized combination of additive printing and laser beam machining operations. The 3D printer 202 can include one or more 3D printing electrodes of the additive printing electrode modules 204 depending of 3D printer requirements for 3D object manufacture. The 3D printer 202 performs additive printing and laser beam machining operations based on constraints of both the additive printing electrode modules 204 and the laser beam machining module 206, such constraints can include printing precision limits, speed of the additive printing and laser beam machining operations, and power and material consumption in each layer of the series of layers to manufacture 3D objects.

The 3D printer 202 performs additive printing and laser beam machining operations using the printer system constraints, such as time consumed for positioning the printing electrode module 204 and the laser beam machining module 206.

Both the additive printing electrode module 204 and laser-beam machining module 206 of the 3D printer dynamically collaborate with each other in real time, (i.e., each dynamically performing and coordinating operations in sequence and at the same time with each other) to create the 3D object 208. For example, laser-beam machining can be performed on any layer of the 3D object 208 either while additive printing is in progress or after additive printing is completed. Additive printing machining similarly can be performed on any layer of the 3D object 208 after laser-beam machining is completed. The collaborative operations between the additive printing electrode module 204 and laser beam machining module 206 occur in real time with the creation of each layer, layer by layer to manufacture the 3D object 208.

3D printing operations are performed in an identified combination of operations of additive printing by the additive printing electrode module 204 and laser beam machining by the laser beam machining module 206 for each 3D printed layer so that 3D objects can be manufactured efficiently and effectively. For example, inherently fast subtractive laser-beam machining with the laser-beam machining module 206 can be used for creating different types surface texture, edge finishing, cutting of 3D printed material, and the like based on the specifications (e.g., shape, dimension and complexities) of the 3D object to be manufactured. Additive printing by the additive printing electrode module 204 also can create different types surface texture to, for example, achieve an optimal combination of additive printing and laser beam machining operations. Additive printing by the additive printing electrode module 204 also can be faster to overbuild a respective layer and remove a small portion with laser-beam machining operations than to precisely build with additive printing with near zero waste. During 3D printing operations, system 200 can collect material extracted by laser beam machining module and recycle the collected material to the 3D printer electrode module, reducing material waste.

In the disclosed embodiments, an optimized combination of additive printing and laser beam machining operations can be identified for each layer based on the identified system constraints with the specifications of the 3D object 208 to be manufactured and one or more manufacturing goals.

Figure 3:
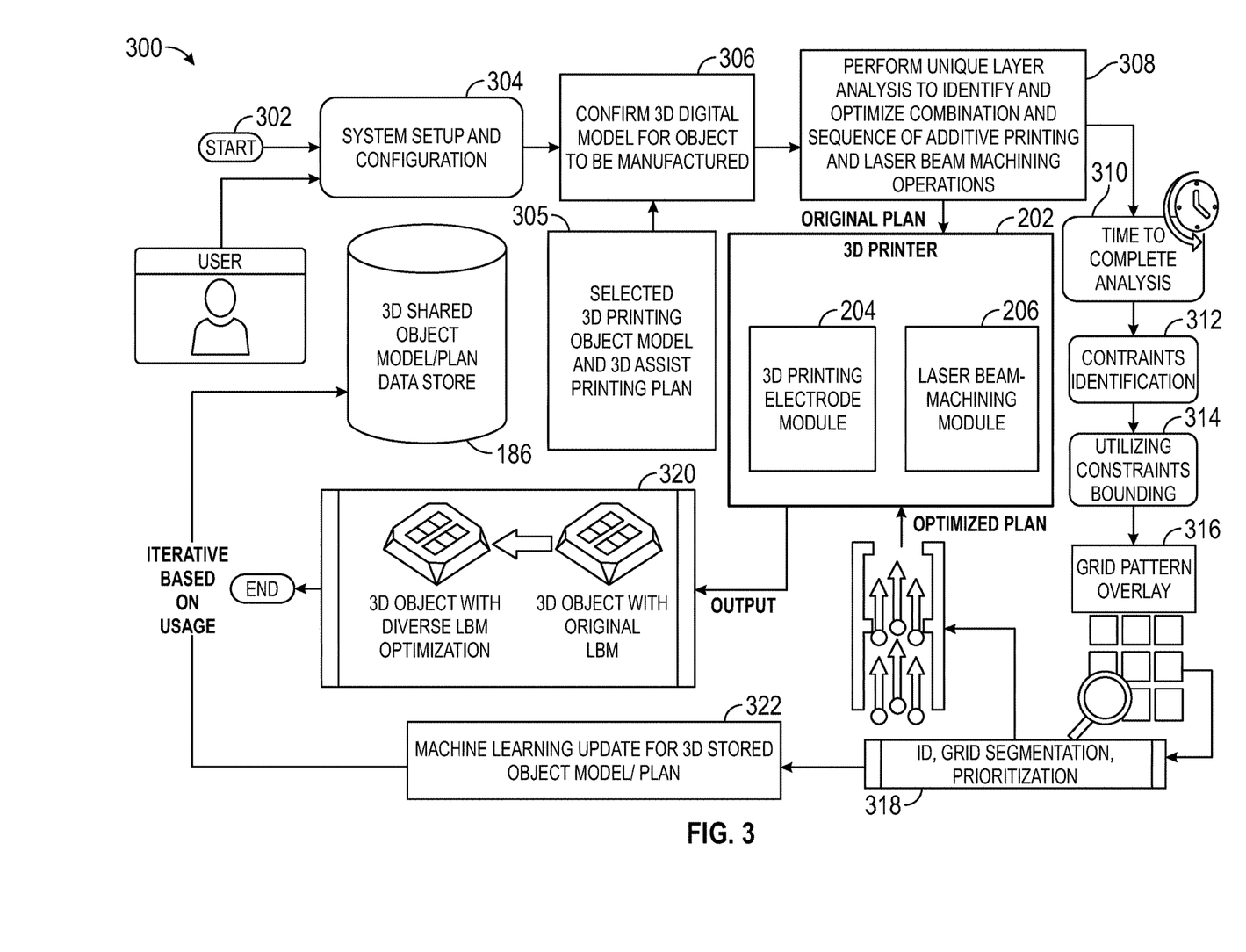
FIG. 3 is a schematic and block diagram illustrating example operations for implementing 3D printing to manufacture 3D objects of one or more disclosed embodiments.

Referring to FIG. 3, illustrated example system operations 300 of system 200 and the 3D Print Object Controller 182 for implementing 3D printing to manufacture 3D objects of one or more disclosed embodiments start at block 302. As indicated at block 304, initial operations include system setup and configuration for the 3D printer 202 with an input received from a user for a 3D object 208 to be manufactured using a combination of additive and subtractive manufacturing operations of disclosed embodiments. At block 305, a specific 3D printed object model and 3D assist printing plan selected from the 3D Shared Object Model/Plan Data Store 186 provides a specific digital 3D model for the user input 3D object 208 to be manufactured. At block 306, the received 3D printed object model/plan is confirmed for the user selected 3D object 208 to be manufactured. At block 308, system 200 performs unique layer analysis to identify an optimized combination and sequence of additive printing and subtractive laser beam machining operations using both the additive printing electrode module 204 and the laser beam machining module 206. The identified collaborative combination and sequence of additive printing and laser beam machining operations can enable optimization for one or more selected goals, for example, time-to-complete, minimum material waste, and relative cost of additive printing versus laser beam machining to manufacture the user selected 3D object 208. Each layer of the 3D object being printed is evaluated to identify the printing and machining combination at block 308, an original plan from the selected 3D printed object model and 3D assist printing plan for the 3D object being manufactured, is applied to the 3D printer 202, which provides a combination of additive printing and subtractive laser beam machining operations.

At block 310, time-to-complete analysis is performed, where optimization may be based on time-to-complete, minimum material waste, and relative cost of printing versus laser beam machining to achieve the desired optimizations based on the identified constraints for printing the 3D object. At block 312, constraints are identified for the 3D printer

202 including constraints for both the additive printing electrode module 204 and the laser beam machining module 206. For example, the constraints can include printing precision limits, speed of printing, speed of laser beam machining, number of additive printing electrodes, type and properties of laser used for laser beam machining, material consumption per area, and the like.

At block 314, operations utilizing constraint bounding are performed, where the system 200 can limit operations for either or both additive printing operations and selected laser beam machining operations. For example, selected additive printing operations and selected laser beam machining operations are limited based on constraint bounding. For example at block 314, constraint bounds for the 3D printed object model can provide minimal laser beam machining (e.g., by limiting use of laser beam machining to printing points where the additive printing has insufficient precision.) Such constraint bounds can limit laser beam machining operations performed for a respective layer, (e.g., perform additive printing of the complete layer surface and machine out extraneous matter with laser beam machining.) For example at block 314, constraint bounds can be identified for cost, time, and material where the bounds can represent one or more of material use extremes, worst time, and cost. For example at block 314, goal based optimization is performed where system 200 selects extreme bounds that can reflect a specific optimization goal or goals more closely.

At block 316, operations for Grid Overlay Analysis are performed for printing optimization. As illustrated below block 316, a print area is overlaid with a grid to allow analysis, such as across an entire object layer surface. At block 316, the Grid Overlay Analysis can include a grading process with each area graded in terms of opportunity for optimization of the goal or goals. At block 318, Grid Segmentation can be based on dual capacity to identify grid segments that most closely match the extremes prioritized for dual capability. At block 318, Segmentation Prioritization can be performed providing a prioritized list of segments, where system 200 can evaluate an identified number of segments for optimization to achieve the optimal goal (time, material, and the like.) After the grid optimization is calculated, a grid order can be defined to assure optimal timing, which includes a grid based transport movement calculation that depends on additive printing electrode idle travel speed. The analysis may be across the entire grid or sequential portions of the overlaid grid. Defining the grid order can further include segmentation sorting where segments are sorted the same way as for grid ordering (i.e., determining a segment order in sequential portions of the overlaid grid or across the grid.) For optimization of laser beam machining versus additive printing, if a machining model provides the closest fit, system 200 can prioritize the segments that require the most laser beam machining first to allow additive printing to outpace laser beam machining. Prioritization of segments at block 318 can be based on printing model fitting, for example if the printing model was the closest fit, system 200 can again prioritize the segments that require the most laser beam machining first to minimize the final machining delay. The 3D printer 202 receives the optimized plan input including ID, Grid Segmentation, and Prioritization schematically illustrated above block 318.

At block 320, illustrated example different manufactured 3D objects provided with the completed operations 300, one 3D object with the original plan (input from block 308) and another 3D object with diverse laser beam machining (LBM) optimization (input from block 318.) At block 322, system 200 provides a machine learning model update to Shared Object Model/Plan Data Store 186 for the machine learning based on the above Grid Overlay Analysis steps (input from block 318). The machine learning model update that is applied to Shared Object Model/Plan Data Store 186 can enable shared future usage of that particular model, plan, and the like. The machine learning model update enables an overall capability to optimize future 3D object printing through both positive and negative feedback within the updated model.

Figure 4:
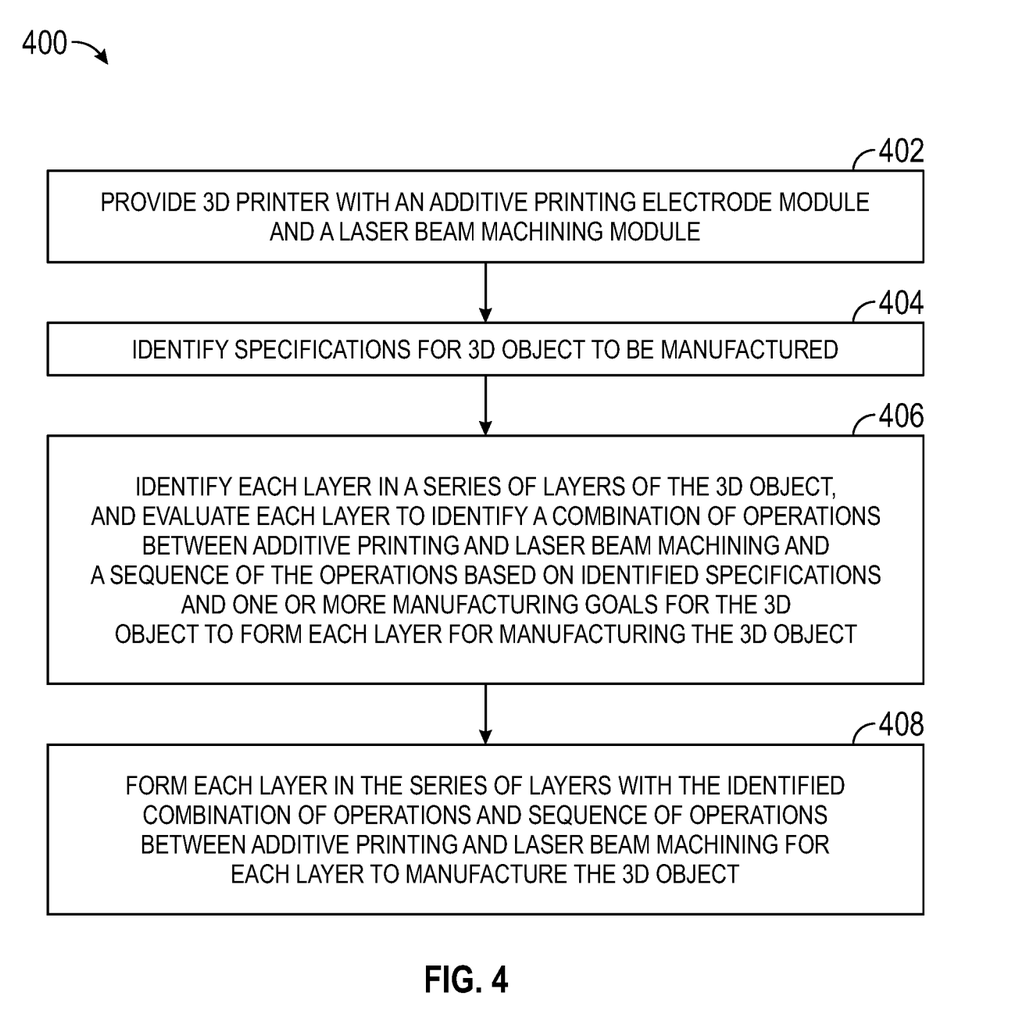
FIG. 4 is a flow chart illustrating example system operations of a method for implementing 3D printing to manufacture 3D objects of one or more disclosed embodiments.

FIG. 4 illustrates example system operations of a method 400 implemented by system 200 and 3D Print Object Controller 182 for enhanced 3D printing to manufacture 3D objects of one or more disclosed embodiments. As indicated at block 402, a 3D printer is provided with an additive printing electrode module and a laser beam machining module. At block 404, the 3D Print Object Controller 182 identifies specifications for the 3D object to be manufactured, which can include shape, dimension and complexities, and including selected object precision requirements of object features or patterns. At block 406, the 3D Print Object Controller 182 identifies each layer in a series of layers of the 3D object to be manufactured, and evaluates each layer based on the specifications and one or more manufacturing goals for the 3D object, to identify a combination and sequence of operations between additive printing and laser beam machining. For example, the 3D Print Object Controller 182 can identify an optimized combination and sequence of operations between additive printing and laser beam machining performing optimization analysis, such as described above in the illustrated optimization steps at blocks 308, 310, 312, 314, 316, and 318 of FIG. 3. That is, the 3D Print Object Controller 182 identifies each layer in a series of layers of the 3D object and can optimize a combination and the sequence of the operations between additive printing and laser beam machining for each layer, for example to achieve a manufacture goal. For example, user selected goals for manufacturing the 3D object can include aggregated manufacturing time, minimum material usage, printing precision limits, and the like. The 3D Print Object Controller 182 evaluates each layer, performing unique analysis for each layer based the specifications and one or more manufacturing goals for the 3D object. The unique layer analysis can include analysis based on material consumption, time-to-complete and printer system cost (i.e., system power usage and system capabilities), for example to achieve at least one manufacturing goal for the identified 3D object. At block 408, the 3D Print Object Controller 182 sequentially forms each layer in the series of layers (layer by layer) using the optimized combination and defined sequence of the operations between additive printing and laser beam machining operations for each layer in the series of layers.

Figure 5:
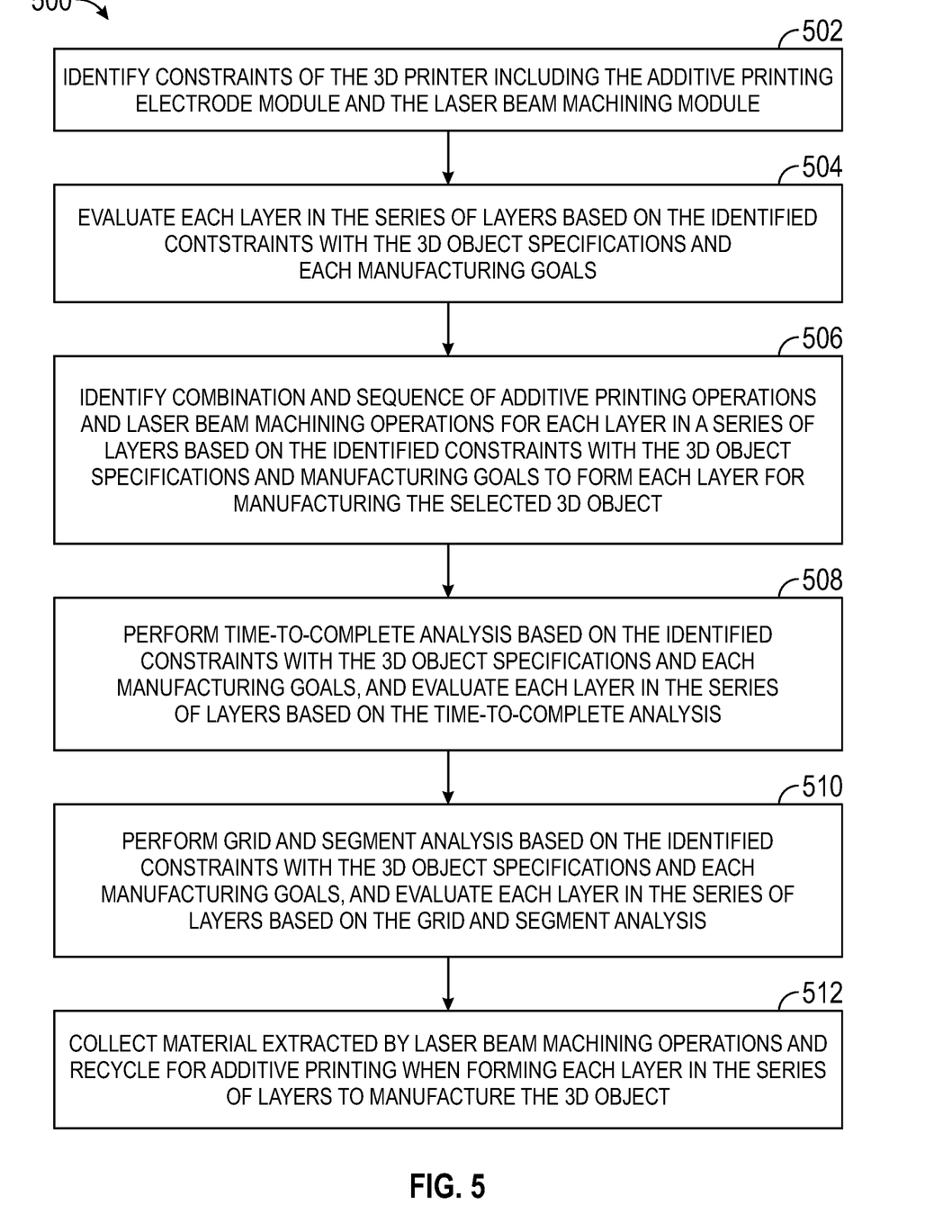
FIG. 5 is a flow chart illustrating further example system optimization operations of a method for implementing of one or more disclosed embodiments.

FIG. 5 illustrates further details of example system operations of a method 500 implemented by system 200 and the 3D Print Object Controller 182 for enhanced 3D printing to manufacture 3D objects of one or more disclosed embodiments. Method 500 provides further details of system operations of the 3D Print Object Controller 182, such as performed at block 406 in FIG. 4 to identify the combination and sequence of operations between additive printing and laser beam machining. As indicated at block 502, the 3D Print Object Controller 182 identifies constraints of the additive printing electrode module 204 and the laser beam machining module 206. For example, the identified constraints can include printing precision limits, speed of additive printing, speed of laser beam machining, number of additive printing electrodes, type and properties of the laser used for laser beam machining operations, material consumption per area, time consumed for positioning the printing electrode module 204 and the laser beam machining module 206, and the like.

At block 504, the 3D Print Object Controller 182 identifies a combination and sequence of operations between the additive printing and laser beam machining for each layer based on the identified constraints with the specifications and one or more manufacturing goals for the 3D object for each layer in the series of layers for manufacturing the particular 3D object. For example, the 3D Print Object Controller 182 applies the identified constraints in the analysis and optimization of combined operations of the additive printing electrode module and laser beam machining module at block 504 together with the 3D object specifications. For example, significant factors applied in the layer analysis based on the identified constraints may include additive printing precision limits, and the type and properties of the laser used for laser beam machining operations to identify the combination and operation sequence for each layer to achieve one or more manufacturing goals for object precision of 3D object. The 3D Print Object Controller 182 performs optimization analysis based on the specifications and one or more manufacturing goals of the 3D object such as described above for the illustrated steps of FIG. 3 and FIG. 4.

As indicated at block 506, the 3D Print Object Controller 182 performs time-to-complete analysis based on the 3D object specifications and the identified constraints, which is used to identify an optimized combination and sequence of operations between the additive printing electrode and laser beam machining for each layer. For example, identified constraints can include speed of additive printing, speed of laser beam machining, time consumed for positioning the printing electrode module 204 and the laser beam machining module 206, providing the most significant factors applied in the layer analysis to achieve a goal to limit manufacturing time. These time analysis constraints can be combined with selected other constraints, such as additive printing precision limits, type and properties of the laser used for laser beam machining operations based on goals to limit material consumption and to limit manufacturing time.

As indicated at block 508, the 3D Print Object Controller 182 performs grid overlay and segment analysis based on the 3D object specifications and the identified constraints, which is used to identify an optimized combination and sequence of operations between the additive printing electrode and laser beam machining for each layer. For example, the 3D print object controller identifies a print area of each layer based on the specifications of the 3D object, and performs grid overlay analysis of the print area and processes and priorities segments in the grid. The grid overlay and segment analysis can be used to optimize the combination and the sequence of operations of additive printing and laser beam machining for optimizing the manufacture of the 3D object.

As indicated at block 510, the 3D Print Object Controller 182 collects material extracted by laser beam machining operations and recycles the extracted material for additive printing, reducing material waste in the manufacture 3D objects. For example, following the laser beam machining operations the 3D Print Object Controller 182 monitors an area processed by laser beam machining to identify loose material or debris; and collects and moves this material to a material supply for additive printing.

While the foregoing is directed to embodiments of the present invention, other and further embodiments of the invention may be devised without departing from the basic scope thereof, and the scope thereof is determined by the claims that follow.

What is claimed is:

1. A method comprising:
    retrieving, from a 3D shared object model data store, specifications of a 3D object to be manufactured by a 3D printer comprising an additive printing electrode module and a laser beam machining module, the 3D object comprising a series of layers;
    evaluating, using a 3D print object controller operatively coupled with the 3D printer, each layer of the series of layers based on the specifications and one or more manufacturing goals for the 3D object, wherein the one or more manufacturing goals comprises minimizing an aggregated manufacturing time, wherein the evaluating each layer of the series of layers comprises:
        overlaying at least a portion of the layer with a grid to define a plurality of grid segments;
        grading each grid segment of the plurality of grid segments according to an ability to optimize the grid segment according to the one or more manufacturing goals; and
        defining, based on the grading and on an idle travel speed of the additive printing electrode module, a grid order for manufacturing the plurality of grid segments with a minimum manufacturing time for the layer;
    identifying, using the 3D print object controller, a sequence of operations for forming the series of layers using the 3D printer, wherein the sequence of operations is based on the evaluation and specifies, for at least one layer of the series of layers, at least one additive printing operation and at least one laser beam machining operation for forming the layer; and
    transmitting, using the 3D print object controller, control signals to the additive printing electrode module and to the laser beam machining module to form each layer of the series of layers according to the sequence of operations.

2. The method of claim 1, further comprising:
    collecting material removed by laser beam machining operations of the sequence of operations; and
    recycling the collected material for additive printing operations.

3. The method of claim 1, wherein evaluating each layer of the series of layers based on the identified specifications and the one or more manufacturing goals for the 3D object is further based on one or more constraints of the additive printing electrode module and one or more constraints of the laser beam machining module.

4. The method of claim 1, wherein identifying the sequence of operations comprises identifying a combination of additive printing operations to overbuild the layer and laser beam machining operation to remove a portion of the overbuild.

5. The method of claim 1,
    wherein evaluating each layer of the series of layers based on the identified specifications and the one or more manufacturing goals for the 3D object further comprises performing a time-to-complete analysis for each layer of the plurality of layers.

6. The method of claim 1, wherein evaluating each layer based on the identified specifications and the one or more manufacturing goals for the 3D object further comprises:
    performing a grid and segment analysis for each layer; and evaluating each layer in a series of layers based on the grid and segment analysis.

7. The method of claim 1, wherein evaluating each layer based on the identified specifications and the one or more manufacturing goals for the 3D object further comprises:
defining a plurality of grid segments within a defined print grid; and
prioritizing segments for additive printing and laser beam machining operations based on the identified specifications and the one or more manufacturing goals for the 3D object.

8. The method of claim 1, wherein evaluating each layer based on the identified specifications and the one or more manufacturing goals for the 3D object further comprises:
utilizing constraint bounding to selectively limit operations of at least one of additive printing and laser beam machining for each layer.

9. The method of claim 8, further comprising:
providing a machine learning update for a 3D printing object model and printing plan for the 3D object, the machine learning update based on the identified combination and the sequence of operations between additive printing and laser beam machining for each layer to manufacture the 3D object.

10. A system, comprising:
a processor configured to operatively couple with a 3D printer comprising an additive printing electrode module and a laser beam machining module; and
a memory comprising a computer program product configured to perform operations to implement a 3D print object controller for the 3D printer, the operations comprising:
retrieving, from a 3D shared object model data store, specifications of a 3D object to be manufactured by the 3D printer, the 3D object comprising a series of layers;
evaluating each layer of the series of layers based on the identified specifications and one or more manufacturing goals for the 3D object wherein the one or more manufacturing goals comprises minimizing an aggregated manufacturing time, wherein the evaluating each layer of the series of layers comprises:
overlaying at least a portion of the layer with a grid to define a plurality of grid segments;
grading each grid segment of the plurality of grid segments according to an ability to optimize the grid segment according to the one or more manufacturing goals; and
defining, based on the grading and on an idle travel speed of the additive printing electrode module, a grid order for manufacturing the plurality of grid segments with a minimum manufacturing time for the layer;
identifying, based on the evaluation of each layer of the series of layers, a sequence of operations for forming the series of layers using the 3D printer, wherein the sequence of operations specifies, for at least one layer of the series of layers, at least one additive printing operation and at least one laser beam machining operation for forming the layer; and
transmitting control signals to the additive printing electrode module and to the laser beam machining module to form each layer of the series of layers according to the sequence of operations.

11. The system of claim 10, further comprising:
collecting material removed by laser beam machining operations of the sequence of operations; and
recycling the collected material for additive printing operations.

12. The system of claim 10, wherein evaluating each layer of the series of layers based on the identified specifications and the one or more manufacturing goals for the 3D object is further based on one or more constraints of the additive printing electrode module and one or more constraints of the laser beam machining module.

13. The system of claim 12,
wherein evaluating each layer of the series of layers based on the identified specifications and the one or more manufacturing goals for the 3D object further comprises performing a time-to-complete analysis for each layer of the plurality of layers.

14. The system of claim 10, wherein evaluating each layer based on the identified specifications and the one or more manufacturing goals for the 3D object further comprises;
performing a grid and segment analysis for each layer; and
evaluating each layer in a series of layers based on the grid and segment analysis.

15. A computer program product for implementing a 3D print object controller for a 3D printer, the computer program product comprising:
a computer-readable storage medium having computer-readable program code embodied therewith, the computer-readable program code executable by one or more computer processors to perform an operation comprising:
retrieving, from a 3D shared object model data store, specifications of a 3D object to be manufactured by the 3D printer comprising an additive printing electrode module and a laser beam machining module, the 3D object comprising a series of layers;
evaluating each layer of the series of layers based on the identified specifications and one or more manufacturing goals for the 3D object, wherein the one or more manufacturing goals comprises minimizing an aggregated manufacturing time, wherein the evaluating each layer of the series of layers comprises:
overlaying at least a portion of the layer with a grid to define a plurality of grid segments;
grading each grid segment of the plurality of grid segments according to an ability to optimize the grid segment according to the one or more manufacturing goals; and
defining, based on the grading and on an idle travel speed of the additive printing electrode module, a grid order for manufacturing the plurality of grid segments with a minimum manufacturing time for the layer;
identifying, based on the evaluation of each layer of the series of layers, a sequence of operations for forming the series of layers using the 3D printer, wherein the sequence of operations specifies, for at least one layer of the series of layers, at least one additive printing operation and at least one laser beam machining operation for forming the layer; and
transmitting control signals to the additive printing electrode module and to the laser beam machining module to form each layer of the series of layers according to the sequence of operations.

16. The computer program product of claim 15, wherein evaluating each layer of the series of layers based on the identified specifications and the one or more manufacturing goals for the 3D object is further based on one or more constraints of the additive printing electrode module and one or more constraints of the laser beam machining module.

17. The computer program product of claim 15, wherein evaluating each layer based on the identified specifications and the manufacturing goals for the 3D object comprises:
performing a grid and segment analysis for each layer; and
evaluating each layer in a series of layers based on the grid and segment analysis.

18. The computer program product of claim 15, wherein evaluating each layer of the series of layers based on the identified specifications and the one or more manufacturing goals for the 3D object further comprises performing a time-to-complete analysis for each layer of the plurality of layers.

19. The method of claim 1, wherein the one or more manufacturing goals comprises further comprises one or more of minimizing material consumption, minimizing power consumption, and minimizing overall cost.

20. The method of claim 3, wherein the one or more constraints of the additive printing electrode module and the one or more constraints of the laser beam machining module each comprises one or more of the following:
a printing precision limit;
a speed of additive printing;
a speed of laser beam machining;
a number of additive printing electrodes;
a type and properties of laser used for laser beam machining;
a power consumption;
a material consumption per area; and
a time consumed for positioning.

* * * * *